United States Patent
Matsumoto et al.

(10) Patent No.: US 9,202,481 B1
(45) Date of Patent: Dec. 1, 2015

(54) NEAR-FIELD TRANSDUCER WITH COMPOSITIONALLY GRADED MATERIAL FOR HEAT ASSISTED MAGNETIC RECORDING

(71) Applicant: HGST Netherlands B.V., Amsterdam (NL)

(72) Inventors: Takuya Matsumoto, Sunnyvale, CA (US); Vijay Prakash Singh Rawat, San Jose, CA (US)

(73) Assignee: HGST NETHERLANDS B.V., Amsterdam (NL)

(*) Notice: Subject to any disclaimer, the term of this patent is extended or adjusted under 35 U.S.C. 154(b) by 0 days.

(21) Appl. No.: 14/638,794

(22) Filed: Mar. 4, 2015

(51) Int. Cl.
G11B 5/02 (2006.01)
G11B 11/00 (2006.01)
G11B 5/31 (2006.01)

(52) U.S. Cl.
CPC .................................. *G11B 5/314* (2013.01)

(58) Field of Classification Search
CPC ............ G11B 5/3903; G11B 2220/90; G11B 2220/30; G11B 2005/0005; G11B 5/314; G11B 2005/0021
USPC ........ 360/59, 245.3; 369/13.33, 13.32, 13.13, 369/112.27, 13.02
See application file for complete search history.

(56) References Cited

U.S. PATENT DOCUMENTS

| | | | |
|---|---|---|---|
| 7,835,101 B2 * | 11/2010 | Takayama et al. ............... | 360/59 |
| 8,000,178 B2 | 8/2011 | Shimazawa et al. | |
| 8,427,925 B2 | 4/2013 | Zhao et al. | |
| 8,526,275 B1 | 9/2013 | Yuan et al. | |
| 2013/0279315 A1 | 10/2013 | Zhao et al. | |
| 2013/0286799 A1 | 10/2013 | Zhu et al. | |
| 2014/0043948 A1 | 2/2014 | Hirata et al. | |
| 2014/0254336 A1 | 9/2014 | Jandric et al. | |

FOREIGN PATENT DOCUMENTS

WO 2013/163195 A1 10/2013

OTHER PUBLICATIONS

Nano Meta Technologies, Inc.; Heat-Assisted Magnetic Recording (HAMR); 1 page; date unknown.
Zhou, et al.; Plasmonic Near-Field Transducer for Heat-Assisted Magnetic Recording; 15 total pages; 2014.
Bhargava, et al.; Multi-Objective Inverse Design of Sub-Wavelength Optical Focusing Structures for Heat Assisted Magnetic Recording; Paper Abstract; 1 page; Sep. 5, 2014.

* cited by examiner

*Primary Examiner* — Nabil Hindi
(74) *Attorney, Agent, or Firm* — Patterson & Sheridan, LLP

(57) ABSTRACT

Embodiments disclosed herein generally relate to a HAMR head. The HAMR head includes a main pole, a waveguide and a NFT disposed between the main pole and the waveguide. The NFT includes an antenna, and the antenna is made of a compound that has a composition that varies based on the location within the antenna. In one embodiment, the antenna has a surface at a media facing surface (MFS) and the surface has an apex, and the composition of the compound varies from the apex in a direction away from the apex. The apex has the highest temperature during the operation of the HAMR head, and having a composition that is thermally stable at the apex helps achieve higher reliability.

20 Claims, 10 Drawing Sheets

|  | AuRh | AuCo | AuNi | Au |
|---|---|---|---|---|
| THERMAL STABILITY | HIGH | MEDIUM | LOW | VERY LOW |
| LIGHT ABSORPTION | LARGE | LOW | LOW | LOW |
| THERMAL CONDUCTIVITY | LOW | LOW | HIGH | HIGH |
*Fig. 7D*
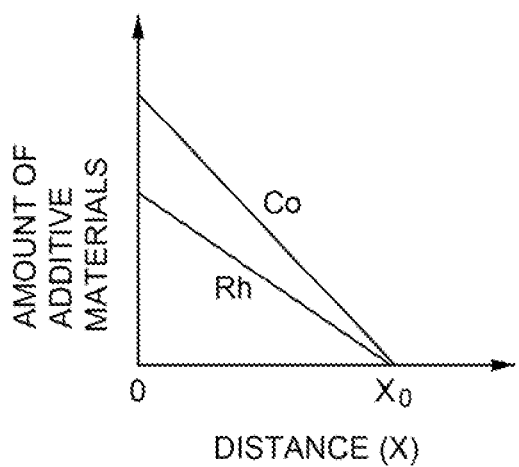
*Fig. 8A*
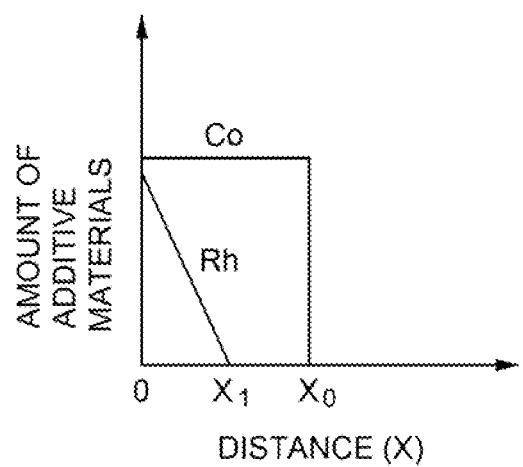
*Fig. 8B*
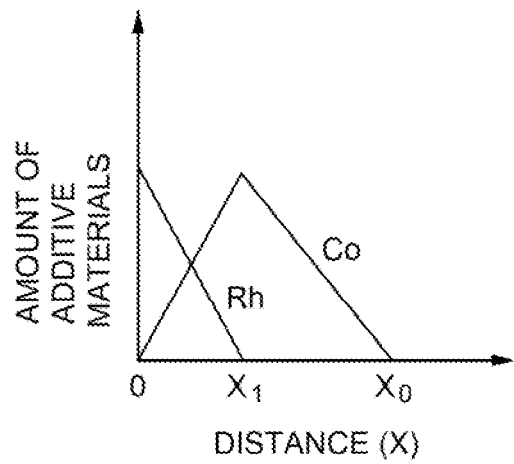
*Fig. 8C*

NEAR-FIELD TRANSDUCER WITH COMPOSITIONALLY GRADED MATERIAL FOR HEAT ASSISTED MAGNETIC RECORDING

BACKGROUND

1. Field

Embodiments disclosed herein generally relate to a magnetic disk device employing a heat assisted magnetic recording (HAMR) head.

2. Description of the Related Art

In a magnetic disk device that employs a HAMR head, a near-field transducer (NFT) may be utilized to locally heat magnetic media having high coercivity during recording to lower the coercivity of the localized region. Gold is typically used for the NFT material to achieve a high optical efficiency, but the melting point of gold is low and deformation of the NFT is a problem when the NFT is heated for a long term. The NFT temperature is especially high near the point where the optical near-field is generated, and the maximum temperature reaches more than 150 degrees Celsius over the operational temperature of the magnetic disk device. When the NFT temperature is more than 150 degrees Celsius over the operational temperature of the magnetic disk device, atomic diffusion of gold atoms via surface, grain boundary, or lattice increases significantly, causing the NFT to deform.

One solution is to use an alloy for the NFT material which is more stable at elevated temperatures. However, the use of the alloy increases the NFT temperature during operation for two reasons: 1) the imaginary part of the dielectric constant is large, and more light is absorbed by the NFT, and 2) the thermal conductivity of the NFT is lowered due to phonon scattering by dopant atoms, and the heat flow inside the NFT is reduced. If the NFT temperature rise is too high, the benefit of using the alloy may be cancelled out.

Therefore, there is a need in the art for an improved HAMR head.

SUMMARY

Embodiments disclosed herein generally relate to a HAMR head. The HAMR head includes a main pole, a waveguide and a NFT disposed between the main pole and the waveguide. The NFT includes an antenna, and the antenna is made of a compound that has a composition that varies based on the location within the antenna. In one embodiment, the antenna has a surface at a media facing surface (MFS) and the surface has an apex, and the composition of the compound varies from the apex in a direction away from the apex. The apex has the highest temperature during the operation of the HAMR head, and having a composition that is thermally stable at the apex helps achieve higher reliability.

In one embodiment, a HAMR head includes a main pole, a waveguide and an NFT disposed between the main pole and the waveguide. The NFT includes an antenna, and the antenna includes a first surface at a MFS. The first surface has an apex. The antenna includes a compound having a composition that varies from the apex in a direction away from the apex.

In another embodiment, a HAMR head includes a main pole, a waveguide and an NFT disposed between the main pole and the waveguide. The NFT includes an antenna, and the antenna includes a first surface at a MFS, a second surface facing the waveguide, and a third surface connecting the first and second surfaces. The antenna includes a compound having a composition that varies from the third surface in a direction that is substantially perpendicular to the third surface.

In another embodiment, a hard disk drive includes a magnetic media, a magnetic read head, and a HAMR magnetic write head that includes a main pole, a waveguide and an NFT disposed between the main pole and the waveguide. The NFT includes an antenna, and the antenna includes a first surface at a MFS. The first surface has an apex. The antenna includes a compound having a composition that varies from the apex in a direction away from the apex.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

FIGS. 7A-7D illustrate an antenna including a composition having more than one additive material, according to various embodiments.

FIGS. 8A-8C illustrate the antenna including a composition having more than one additive material, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to a HAMR head. The HAMR head includes a main pole, a waveguide and a NFT disposed between the main pole and the waveguide. The NFT includes an antenna, and the antenna is made of a compound that has a composition that varies based on the location within the antenna. In one embodiment, the antenna has a surface at a MFS and the surface has an apex, and the composition of the compound varies from the apex in a direction away from the apex. The apex has the highest temperature during the operation of the HAMR head, and having a composition that is thermally stable at the apex helps achieve higher reliability.

Figure 1A:
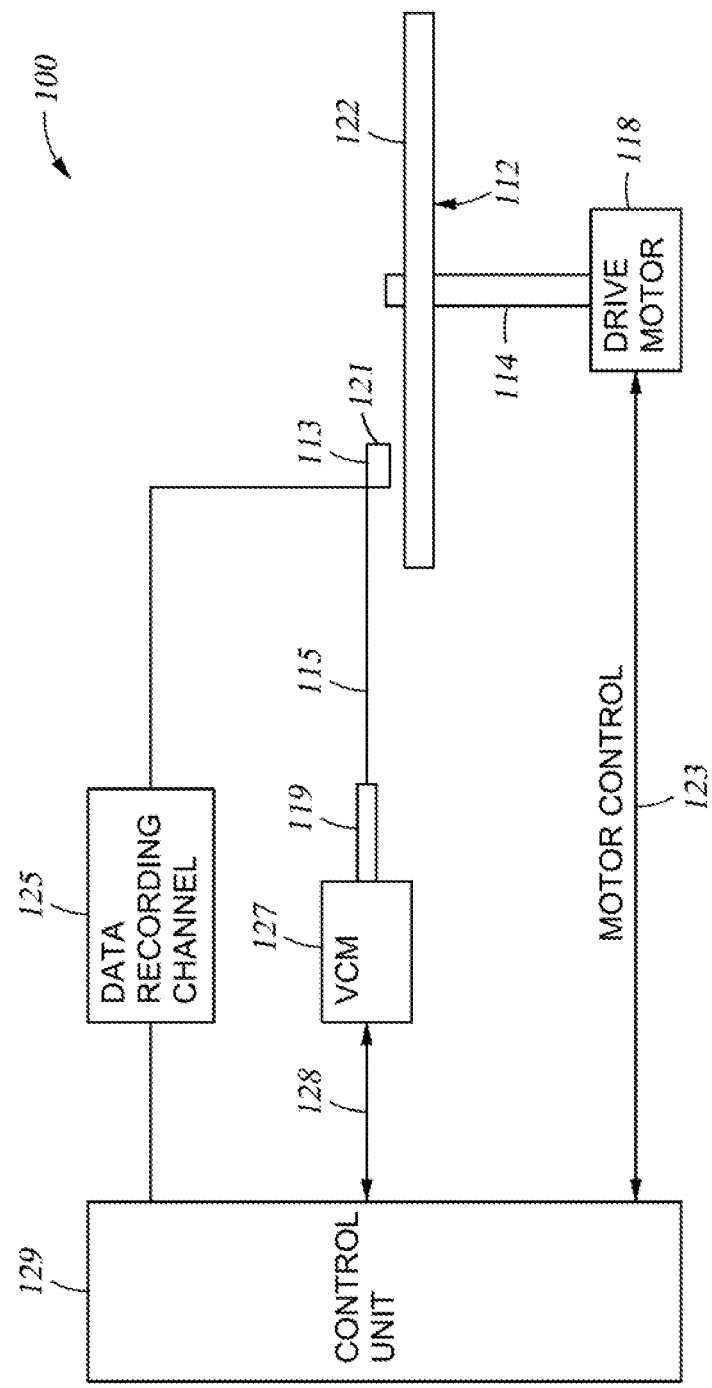
FIGS. 1A and 1B illustrate a disk drive system according to embodiments described herein.

FIG. 1A illustrates a disk drive 100 embodying this disclosure. As shown, at least one rotatable magnetic media 112 is supported on a spindle 114 and rotated by a disk drive motor 118. The magnetic recording on each media is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121 that may include a radiation source (e.g., a laser or LED) for heating the media surface 122. As the magnetic media 112 rotates, the slider 113 moves radially in and out over the media surface 122 so that the magnetic head assembly 121 may access different tracks of the magnetic media 112 to read or record data. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by control unit 129.

During operation of a HAMR enabled disk drive 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 slightly above the media 112 surface by a small, substantially constant spacing during normal operation. The radiation source heats up the high-coercivity media so that the write elements of the magnetic head assembly 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of media and actuators, and each actuator may support a number of sliders.

Figure 1B:
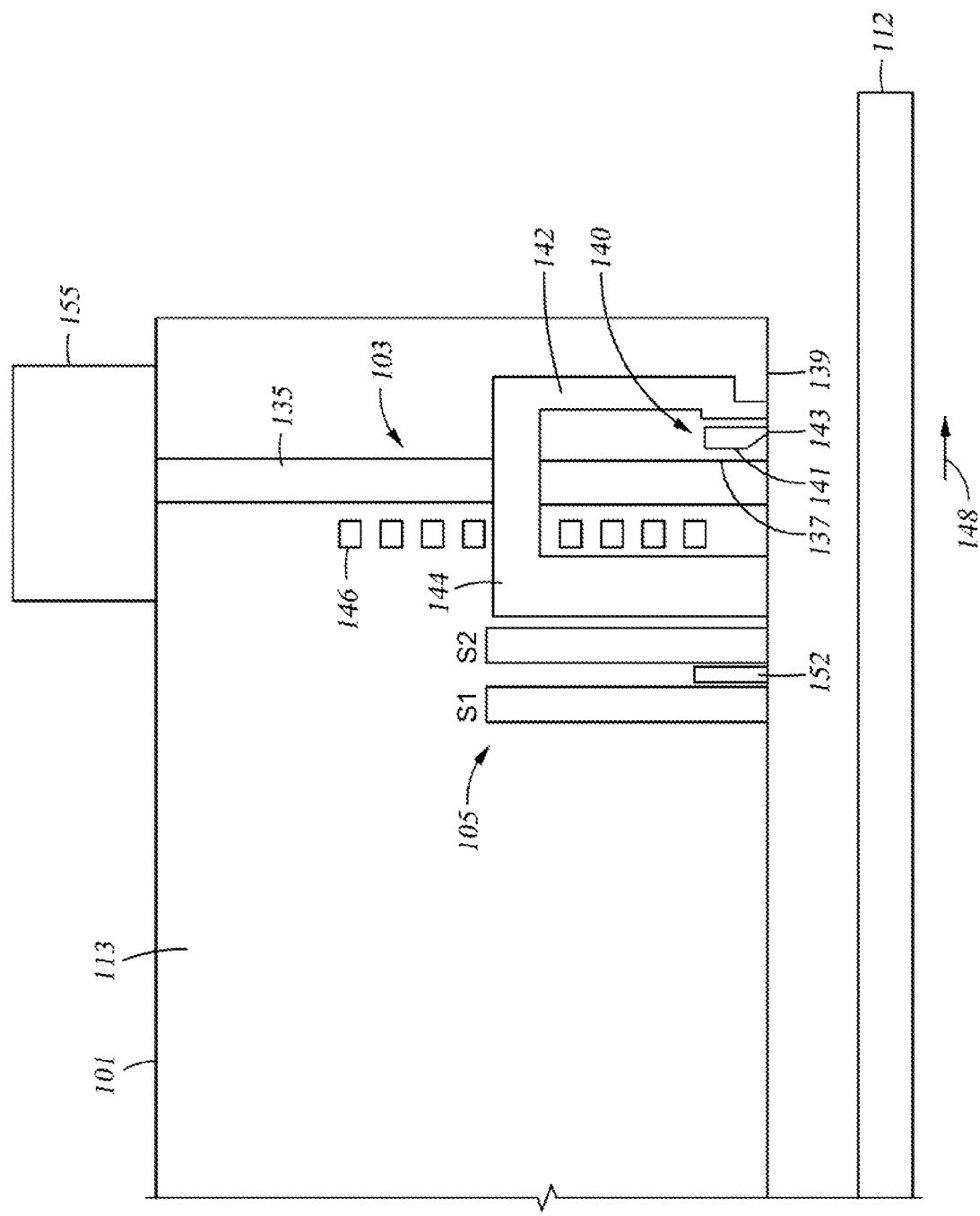

FIG. 1B is a fragmented, cross sectional side view of a HAMR read/write head 101 and magnetic media 112 of the disk drive 100 of FIG. 1. The read/write head 101 may correspond to the magnetic head assembly 121 described in FIG. 1. The read/write head 101 includes a MFS 139, such as an air bearing surface (ABS), a magnetic write head 103 and a magnetic read head 105, and is mounted on the slider 113 such that the MFS 139 is facing the magnetic media 112. As shown in FIG. 1B, the magnetic media 112 moves past the magnetic write head 103 in the direction indicated by the arrow 148. As shown in FIG. 1B and subsequent figures, the X direction denotes an along-the-track direction, the Y direction denotes a track width or cross-track direction, and the Z direction denotes a direction substantially perpendicular to the MFS 139.

In some embodiments, the magnetic read head 105 is a magnetoresistive (MR) read head that includes an MR sensing element 152 located between MR shields S1 and S2. In other embodiments, the magnetic read head 105 is a magnetic tunnel junction (MTJ) read head that includes a MTJ sensing device 152 located between MR shields S1 and S2. The magnetic fields of the adjacent magnetized regions in the magnetic media 112 are detectable by the MR (or MTJ) sensing element 152 as the recorded bits.

The magnetic write head 103 includes a main pole 142, a waveguide 135, a NFT 140 disposed between the main pole 142 and the waveguide 135, a return pole 144, and a coil 146 that excites the main pole 142. The magnetic write head 103 may be operatively attached to a laser 155 (i.e., a radiation source). The laser 155 may be placed directly on the magnetic write head 103 or radiation may be delivered from the laser 155 located separate from the slider 113 through an optical fiber or waveguide. The waveguide 135 is a channel that transmits the radiation through the height of the magnetic write head 103 to the NFT 140—e.g., a plasmonic device or optical transducer—which is located at or near the MFS 139. When radiation, such as a laser beam, is introduced into the waveguide 135, an evanescent wave is generated at a surface 137 of the waveguide 135 that couples to a surface plasmon excited on a surface 141 of the NFT 140. The surface plasmon propagates to a surface 143 of the NFT 140, and an optical near-field spot is generated near an apex (see FIG. 2B) of the surface 143. In other embodiments, the waveguide 135 may not extend to the MFS 139, and the NFT 140 may be disposed at an end of the waveguide 135, so the NFT 140 is aligned with the waveguide 135. The embodiments herein, however, are not limited to any particular type of radiation source or technique for transferring the energy emitted from the radiation source to the MFS 139. The NFT 140 as shown in FIG. 1B is a nanobeak NFT. However, the NFT 140 is not limited to any particular type of NFT. In some embodiments, the NFT 140 is an e-antenna NFT or a lollipop NFT.

Figure 2A:
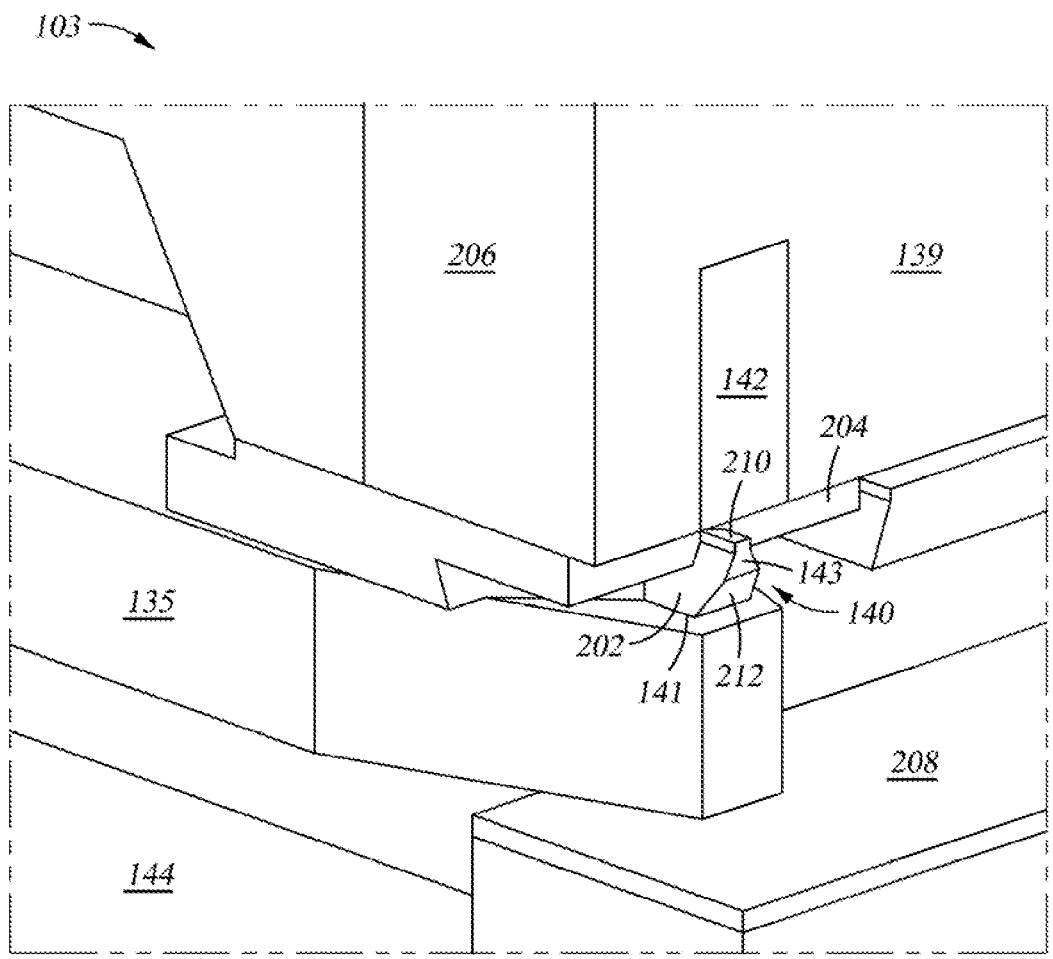
FIGS. 2A and 2B illustrate a HAMR magnetic write head according to one embodiment described herein.

FIG. 2A is a fragmented perspective view of the HAMR magnetic write head 103, according to one embodiment described herein. To better illustrate certain components of the magnetic write head 103, a cladding material and a spacer layer are omitted. The magnetic write head 103 includes the return pole 144, the waveguide 135, the NFT 140, and the main pole 142. The NFT 140 may include an antenna 202, a thermal shunt 204 coupled to the antenna 202, and a spacer layer (shown in FIG. 4) coupled to the antenna 202. The thermal shunt 204 may be made of a conductive material. The magnetic write head 103 may further include a heat sink 206 surrounding the main pole 142 and a mirror layer 208 disposed on a surface of the return pole 144. The thermal shunt 204 may be disposed between the antenna 202 and the heat sink 206, as shown in FIG. 2A, and heat generated in the antenna 202 may flow to the heat sink 206 through the thermal shunt 204. The antenna 202 may include the surface 143 at the MFS 139, the surface 141 facing the waveguide 135, a surface 210 facing the main pole 142, and a surface 212 connecting the surface 143 and the surface 141.

Figure 2B:
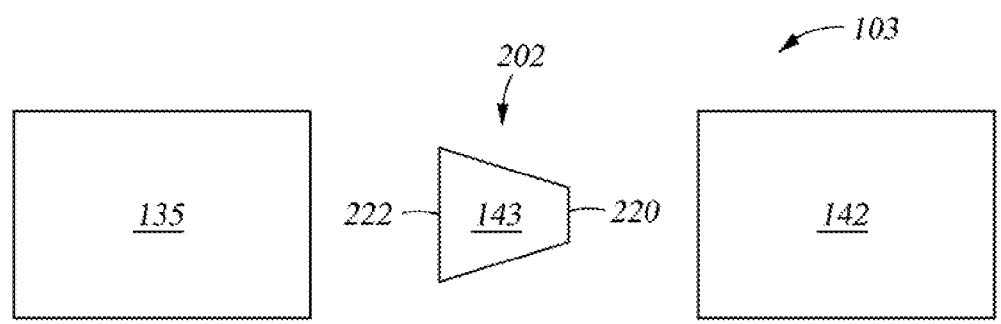

FIG. 2B is a fragmented MFS view of the magnetic write head 103, according to one embodiment described herein. Again the cladding material and the spacer layer are omitted. As shown in FIG. 2B, the antenna 202 is disposed between the waveguide 135 and the main pole 142. The antenna 202 includes the surface 143 at the MFS 139, and the surface 143 may have a trapezoidal shape. The surface 143 may include the apex 220, i.e., an end of the trapezoidal shape that is facing the main pole 142, and another end 222 that is facing the waveguide 135. The apex 220 may endure the highest temperature during the operation of the magnetic write head 103, and a temperature distribution in the antenna 202 is shown in FIG. 3.

Figure 3:
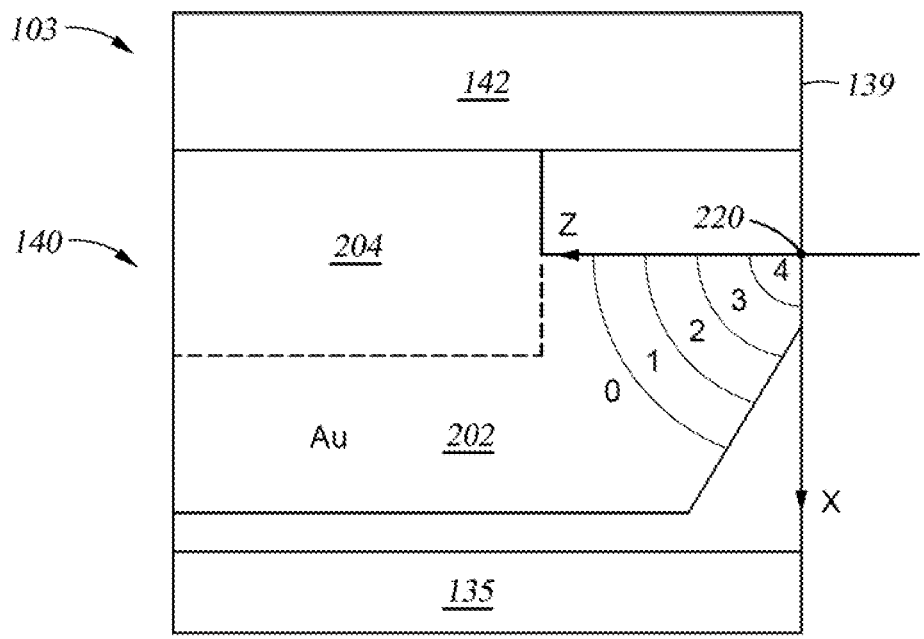
FIG. 3 is a fragmented cross sectional side view of the HAMR magnetic head according to one embodiment.

FIG. 3 is a fragmented cross sectional view of the magnetic write head 103, according to one embodiment described herein. When radiation, such as a laser beam, is introduced into the antenna 202 via the waveguide 135, oscillating charges in the antenna 202 are concentrated at the apex 220, and the concentrated charges generate the optical near-field spot near the apex 220. The oscillating charges also generate heat inside the antenna 202, especially at the apex 220 where the charges are concentrated. Thus, the temperature distribution has a peak at the apex 220, and the temperature decreases with the distance from the apex. As shown in FIG. 3, the antenna 202 has five temperature zones 0, 1, 2, 3, and 4, where zone 4 has the highest temperature, zone 3 has a temperature less than zone 4, zone 2 has a temperature less than zone 3, zone 1 has a temperature less than zone 2, and zone 0 has the lowest temperature during the operation of the magnetic write head 103.

Conventionally, the antenna 202 is either made of a conductive low-loss metal, such as gold, or a high-loss alloy, such as AuRh. However, the conductive metal has a relatively low melting point and the antenna 202, or the NFT 140, may deform. Similarly, a homogenous alloy is also not suitable for NFT, as the temperature within the antenna 202 is not homogeneous and typically the part of the antenna 202 that is the closest to the optical near-field spot, i.e., the apex 220, is the hottest with the temperature gradually decreasing with distance away from the apex 220, as shown in FIG. 3. Thus, using an alloy in the regions of the NFT where temperature is already low may reduce the thermal stability of the NFT owing to reduced thermal conductivity of alloys. Hence, using one composition of an alloy will not give the optimal balance between thermal stability and temperature rise of the antenna 202. In order to optimally balance thermal stability and temperature rise of the antenna 202, the antenna 202 is made of a conductive low-loss metal having a composition that varies based on the location. For example, referring to FIG. 3, zone 4 should have a material or alloy with composition having highest thermal stability and the thermal stability requirements decrease moving from zone 4 to zone 0.

Figure 4:
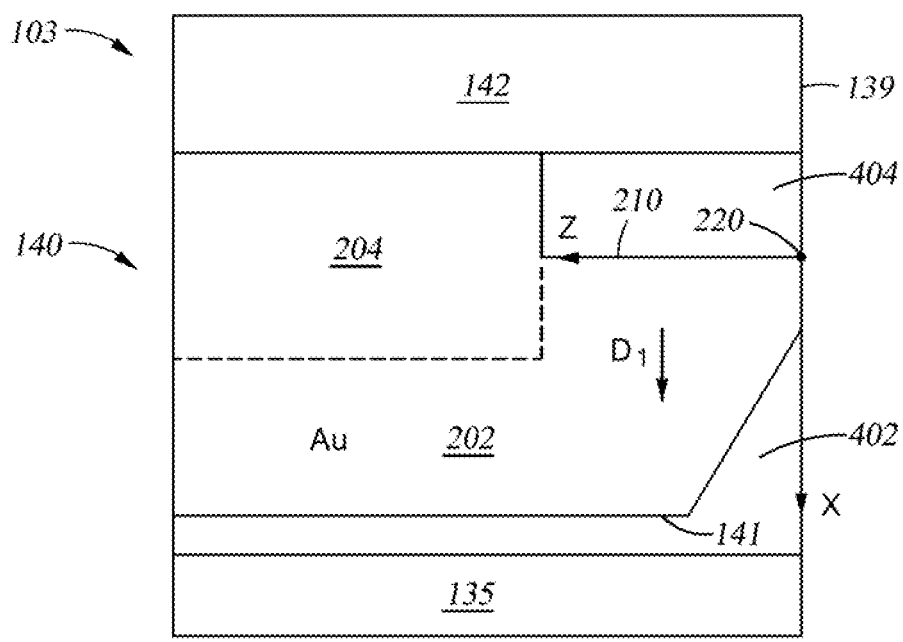
FIG. 4 is a fragmented cross sectional side view of the HAMR magnetic head according to one embodiment.

FIG. 4 is a fragmented cross sectional view of the magnetic write head 103 according to one embodiment. The magnetic write head 103 may include a cladding material 402 disposed between the waveguide 135 and the antenna 202, and the NFT 140 may include a spacer layer 404 disposed between the antenna 202 and the main pole 142. Both the cladding material 402 and the spacer layer 404 may be made of a dielectric material such as alumina, silicon oxide, silicon nitride, silicon oxynitride or the combination thereof. The antenna 202 may be made of a compound having a composition that varies based on the location. In one embodiment, the composition includes a primal material and one or more additive materials in the primal material. The amount of the one or more additive materials in the primal material may vary based on the location. The composition of the antenna 202 may include greater than or equal to 90% of the primal material. The primal material may be a metal, such as Au, Ag, Cu, or Al, or a composite material having two to four elements selected from Au, Ag, Cu and Al. When the primal material is the composite material, the element ratio of the composite material may be gradually changed according to location. The additive material may be at least one of the elements Rh, Co, Ni, Pt, Pd, Ru, B, Mo, W, Ti, Ir and Re.

As shown in FIG. 4, the composition of the compound varies from the surface 210 of the antenna 202 in a direction "D1," which is the direction from the surface 210 to the surface 141 of the antenna 202. The direction "D1" is also the along-the-track direction X. The composition of the compound of the antenna 202 may include the highest amount of additive material in the primal material at the surface 210, and the amount of the additive material gradually decreases with the distance away from the surface 210 in the direction "D1", which is parallel to the MFS. The composition may not include any additive material at a location that is a certain distance away from the surface 210. The apex 220 is located on the surface 210. The composition with the highest amount of additive material at the surface 210 increases the melting point of the composition at the surface 210, which also increases the thermal stability of the antenna 202 at the surface 210. In other words, in order to achieve high reliability, large amount of the additive material is added to the primal material in the region enduring the highest temperature while smaller amounts of the additive material is added to the primal material in regions enduring lower temperatures. Because the temperature gradually decreases with the distance from the apex 220 as shown in FIG. 3, the amount of additive material in the primal material gradually decreases with the distance from the apex 220. With the antenna 202 having such composition, the temperature of the antenna 202 or the NFT 140 can be minimized while the thermal stability of the antenna 202 or the NFT 140 is maintained.

Figure 5A:
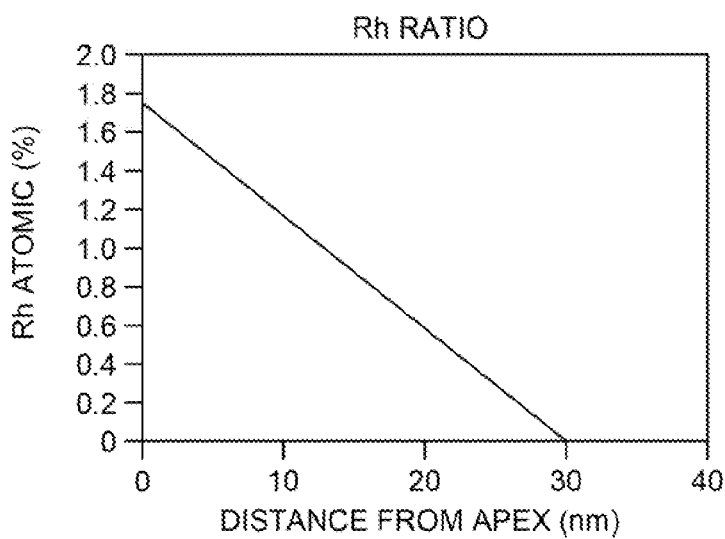
FIGS. 5A-5D are charts showing relationships between atomic percentage of an additive material in a primal material and location, and effects of the various atomic percentages of the additive material in the primal material, according to various embodiments.

FIGS. 5A-5D are charts showing relationships between atomic percentage of an additive material in a primal material and location, and effects of the various atomic percentages of the additive material in the primal material, according to various embodiments. FIG. 5A is a chart showing a relationship between atomic percentage of an additive material in a primal material and the distance from the apex 220 in the along-the-track direction X. In one embodiment, the antenna 202 is made of a compound having a primal material, which is gold (Au), and an additive material, which is rhodium (Rh). As shown in FIG. 5A, the Y axis is the atomic percentage of Rh in AuRh alloy, ranging from about 1.75% to 0%. The X axis is the distance away from the apex 220 in the direction "D1" or the along-the-track direction X. At the apex 220, or the surface 210, the portion of the antenna is AuRh having 1.75% of Rh and 98.25% of Au. The atomic percentage of Rh in AuRh alloy decreases linearly between 0 nm and 30 nm away from the apex 220, and reaches zero, i.e., the compound does not contain any additive material Rh and is entirely the primal material Au, at 30 nm away from the apex 220 in the direction "D1."

Figure 5B:
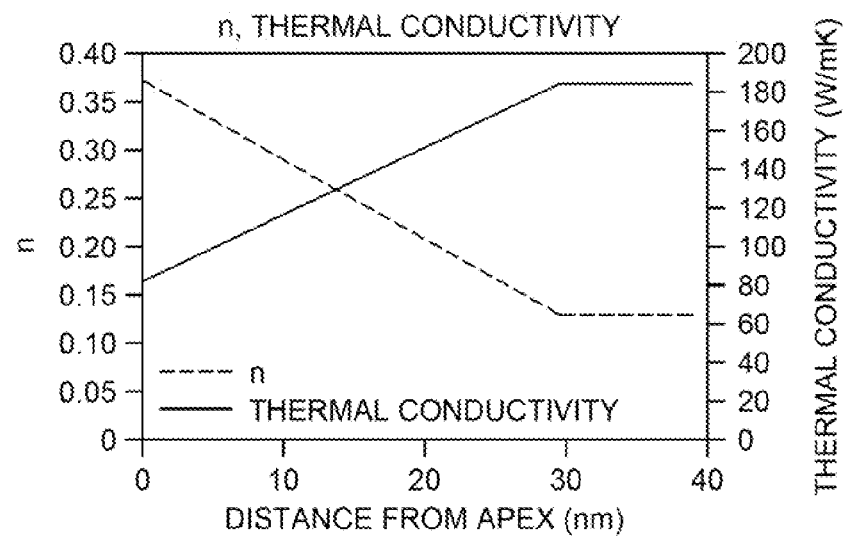

The Rh addition in the compositionally graded AuRh alloy is shown in FIG. 5A. The impact of the Rh addition on the thermal conductivity and the real part of the refractive index n is shown in FIG. 5B. As shown in FIG. 5B, the thermal conductivity is lowest at the apex 220 since the additive material is at the highest level at the apex 220, and gradually increases moving away from the apex 220 since the amount of the additive material is gradually reduced. At 30 nm away from the apex in the "D1" direction, the amount of the additive material is reduced to zero, so the thermal conductivity becomes the highest and constant as distance from the apex 220 increases. On the other hand, the real part of the refractive index n is at the highest at the apex 220 and gradually reduces to a constant value as the distance from the apex 220 increases and reaches 30 nm.

Figure 5C:
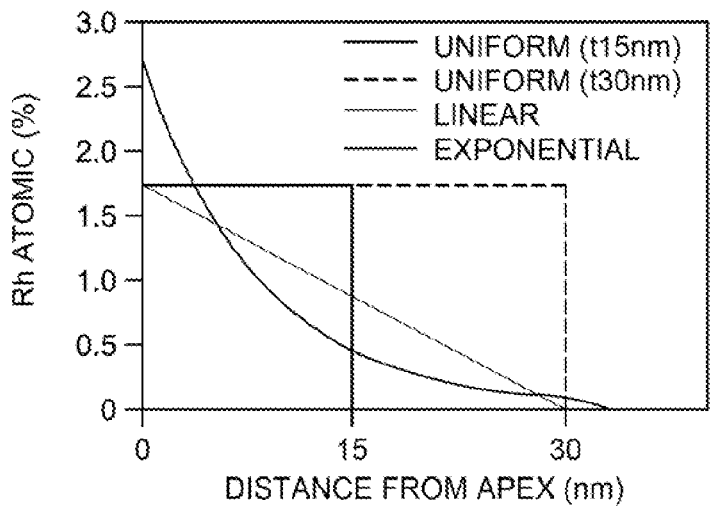
Figure 5D:
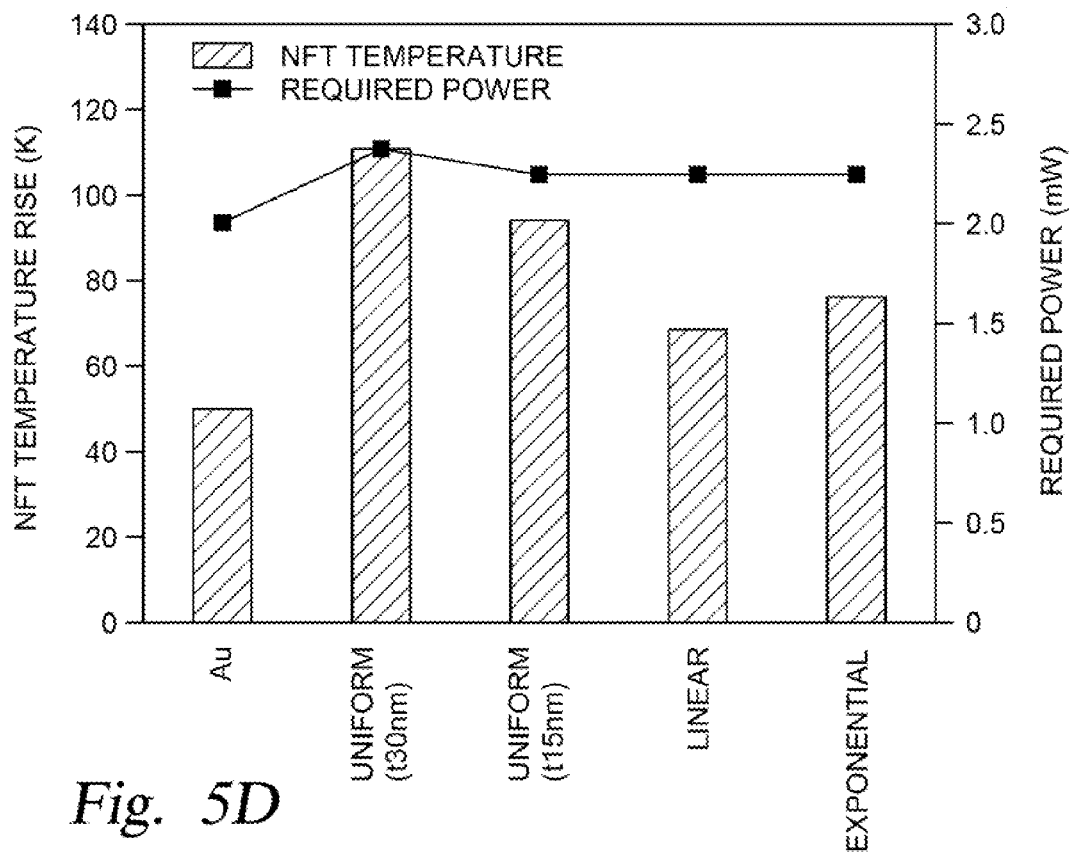

FIGS. 5C and 5D show different composition gradient profiles and the effects of such profiles on the temperature of the antenna 202 or the NFT 140 and the required power to power the NFT 140. Four different profiles of the compositionally graded AuRh alloy are shown: linear, exponential, uniform 15 nm thickness and uniform 30 nm thickness. The total amount of Rh in the antenna 202 with the linear profile is the same as the total amount of Rh in the antenna 202 with the exponential profile, which is the same as the total amount of the Rh in the antenna 202 with the uniform 15 nm thickness profile. In FIG. 5D, the four profiles are compared to each other and to a composition of the antenna 202 that only contains the primal material Au. The first Y axis is the NFT temperature rise, or the antenna temperature rise, the second Y axis is the required input power to the NFT 140 to achieve a fixed hot spot temperature. As shown in FIG. 5D, the linear profile shows the lowest NFT temperature rise next to the Au, and the exponential profile shows a slightly higher temperature rise than the linear profile, but still lower than the uniform thickness profiles. The antenna made of Au may have the lowest temperature rise, but the thermal stability is the lowest since no additive material is added to Au. Even though the total amount of Rh in the antenna 202 is the same for the linear profile and the uniform 15 nm thickness profile, the temperature rise of the linear profile is about 25% lower than the uniform 15 nm thickness profile. In addition, both the linear profile and the uniform 30 nm thickness profile have the same thickness of the additive material (30 nm), the temperature rise of the linear profile is about 40% lower than the uniform 30 nm thickness profile. The exponential profile, even though has a slightly higher temperature rise than the linear profile, has the highest Rh atomic percentage at the apex. Thus, the thermal stability at the apex of the exponential profile is higher than others. There is not a significant difference in the power required for these profiles.

Figure 6A:
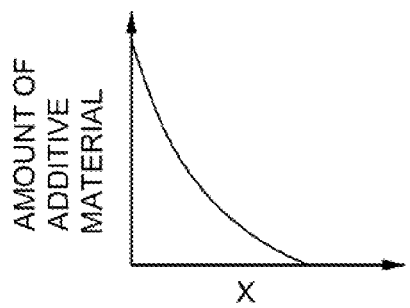
FIGS. 6A-6D are charts showing a distribution of the additive material according to various embodiments.
Figure 6B:
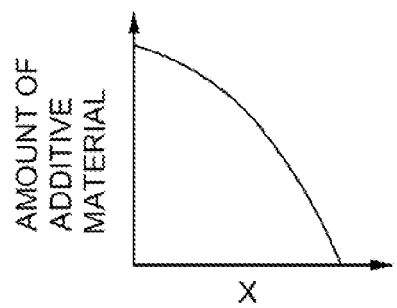
Figure 6C:
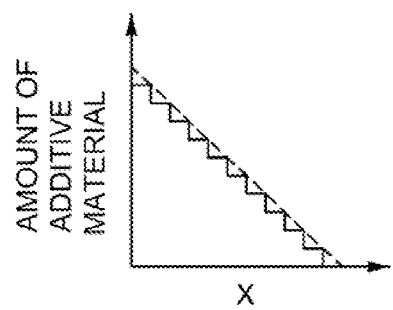
Figure 6D:
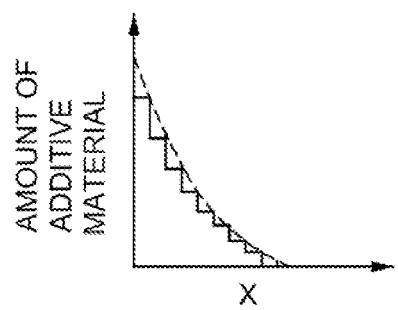

FIGS. 6A-6D are charts showing the distribution of the additive material according to various embodiments. In FIGS. 6A-6D, the amount of additive material (Y axis) is plotted against the distance away from the apex 220 in the direction "D1" (X axis). The amount of the additive material may be changed rapidly near the apex 220, as shown in FIG. 6A, or may be changed slowly near the apex 220, as shown in FIG. 6B. The amount of the additive material may be expressed by an exponential function or a polynomial function. In addition to changing the amount of the additive material continuously, as shown in FIGS. 5A, 6A and 6B, the amount of the additive material may be changed discretely, or changed step-wise, as shown in FIGS. 6C and 6D.

Figure 7A:
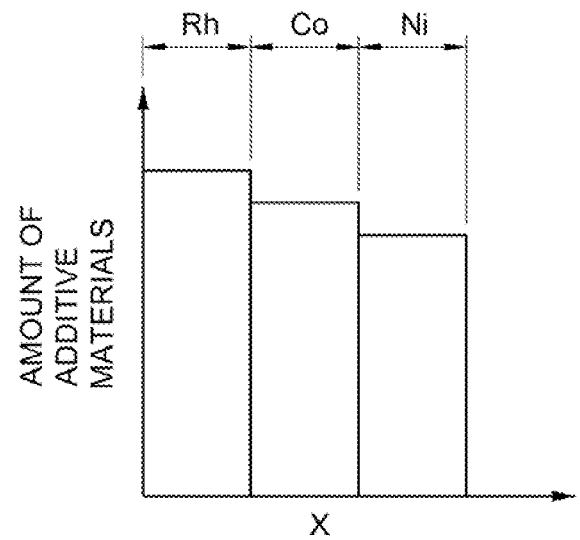
Figure 7B:
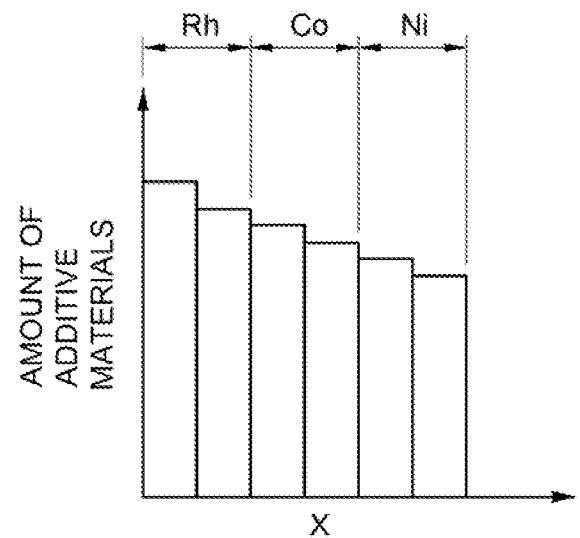
Figure 7C:
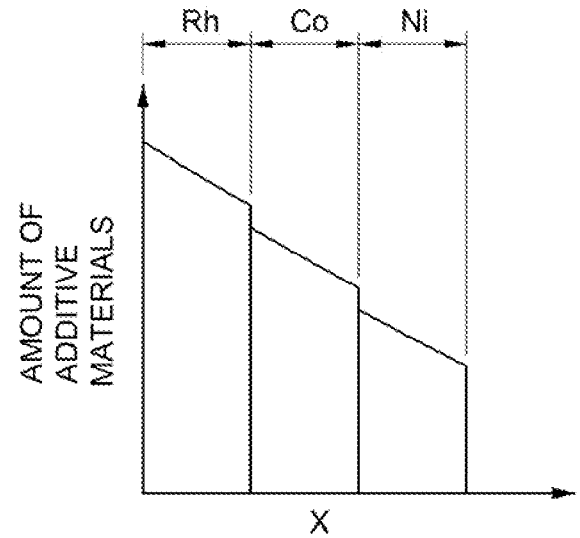

FIGS. 7A-7D illustrate the antenna 202 including a composition having more than one additive material, according to various embodiments. FIGS. 7A-7D illustrate the antenna 202 including a composition having a primal material Au and multiple additive materials Rh, Co, and Ni in the primal material Au. FIGS. 7A-7C are charts showing the amount of additive materials (Y axis) plotted against the distance away from the apex 220 in the direction "D1" (X axis). All three charts show an AuRh layer at the apex 220, an AuCo layer next to the AuRh layer, and an AuNi layer next to the AuCo layer. FIG. 7A shows the layers each having constant amount of additive material, while FIGS. 7B and 7C shows that the layers each having various amount of additive material. FIG. 7B shows a discrete or step-wise change in the amount of additive material while FIG. 7C shows a continuous change in the amount of additive material. AuRh is used at the location having the highest temperature since AuRh is most stable at high temperatures. However, AuRh absorbs a large amount of radiation or light and has a low thermal conductivity. AuCo is less stable at high temperature than AuRh but absorbs less radiation than AuRh when the additive amount is the same or less. AuNi is even less stable at high temperature than AuRh and AuCo, but has greater thermal conductivity than AuRh and AuCo. FIG. 7D shows a table illustrating the properties of different materials relative to each other. By stacking these materials, the temperature of the antenna 202 or the NFT 140 may be reduced while maintaining the thermal stability of the NFT 140. As shown in FIG. 7A, the thickness of each layer AuRh, AuCo and AuNi, may be the same, such as about 10 nm, or different, such as about 3 nm of AuRh, about 10 nm of AuCo and about 10 nm of AuNi. The number of additive materials may be two, such as a layer of AuCo having a thickness of about 10 nm at the apex 220 and a layer of AuNi having a thickness of about 10 nm next to the AuCo layer. The number of additive materials may be greater than three, such as a layer of AuW having a thickness of about 2 nm at the apex 220, a layer of AuRh having a thickness of about 3 nm next to the AuW layer, a layer of AuCo having a thickness of about 5 nm next to the AuRh layer and a layer of AuNi having a thickness of about 10 nm next to the AuCo layer.

FIGS. 8A-8C illustrate the antenna 202 including a composition having more than one additive material, according to various other embodiments. FIGS. 8A-8C are charts showing the amount of additive materials (Y axis) plotted against the distance away from the apex 220 in the direction "D1" (X axis). In one embodiment, there are two additive materials Rh and Co in the primal material Au, thus forming a ternary AuRhCo alloy. As shown in FIG. 8A, at the apex 220, both additive materials Rh and Co are in the primal material Au, and the amount of Co is greater than the amount of Rh at the apex 220. As the distance from the apex 220 increases, the amount of both the Rh and Co in Au decreases linearly, and reaches zero at a distance $x_0$ away from the apex 220. In some embodiments, the amount of Co reaches zero at a distance greater than $x_0$ away from the apex 220. The distance $x_0$ may be any suitable distance away from the apex 220. In one embodiment, the distance $x_0$ is about 15 nm. FIG. 8B shows the amount of one additive material Co is constant from the apex 220 to the distance $x_0$ from the apex 220, while the other additive material Rh decreases linearly from the apex 220 to a distance $x_1$ from the apex 220. The distance $x_1$ may be any suitable distance away from the apex 220. In one embodiment, the distance $x_1$ is about 5 nm.

As shown in FIG. 8C, at the apex 220 there is only one additive material Rh. As the distance from the apex 220 increases, the amount of the additive material Rh decreases linearly, while the amount of another additive Co increases linearly. At the distance $x_1$ away from the apex 220, there is no additive material Rh and the amount of the additive material Co reaches a maximum level. In other words, AuRh is gradually replaced by AuCo from the apex 220 to the distance $x_1$ from the apex 220. The amount of Co in Au decreases linearly from the distance $x_1$ from the apex 220 to the distance $x_0$ to the apex 220. The increases or decreases of the amount of additive materials are not limited to linear, as shown in FIGS. 8A-8C, and may be exponential, polynomial or step-wise as shown in FIGS. 6A-6D.

Figure 9A:
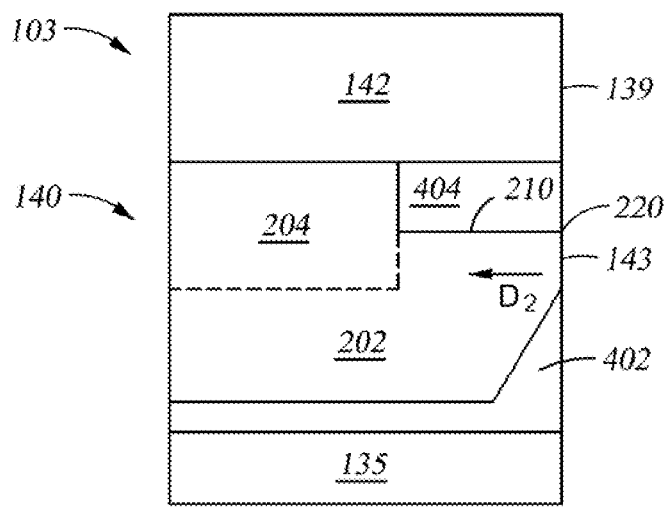
FIGS. 9A-9C are fragmented cross sectional view of the HAMR magnetic head according to various embodiments.
Figure 9B:
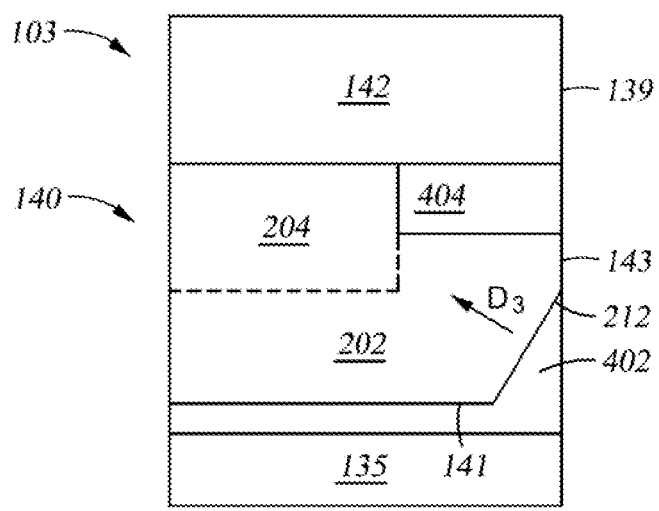
Figure 9C:
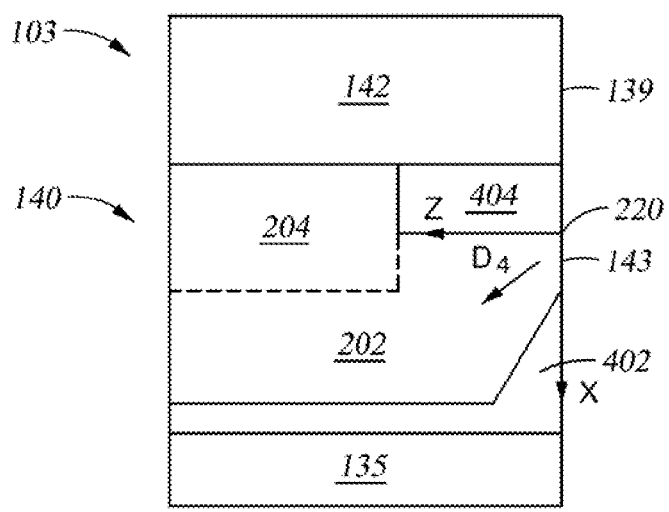

FIGS. 9A-9C are fragmented cross sectional views of the HAMR magnetic head 103 according to various embodiments. Instead of having the highest amount of the additive material at the surface 210 of the antenna 202 as described above, FIGS. 9A-9C illustrate the antenna 202 having the highest amount of additive material in the primal material at other surfaces and the amount of additive material gradually decreases as the distance increases from the surfaces. The primal and additive materials described in FIGS. 9A-9C may be the same primal and additive materials described above. FIG. 9A illustrates the antenna 202 having the surface 143 at the MFS 139 and the apex 220 is located on the surface 143. In one embodiment, the antenna 202 is made of a compound having the highest amount of additive material in the primal material at the surface 143, and the amount of the additive material deceases in a direction "D2" that is substantially perpendicular to the MFS 139 away from the surface 143. The decease may be linear, exponential, polynomial or step-wise as described above. The number of the additive materials and the changes in the amounts of the additive materials may be the same as described above.

FIG. 9B illustrates the antenna 202 having the surface 212 connecting the surface 141 and the surface 143. The surface 212 may form an acute angle with respect to the MFS 139 and may be referred to as a leading edge taper. In one embodiment, the antenna 202 is made of a compound having the highest amount of additive material in the primal material at the surface 212, and the amount of the additive material deceases in a direction "D3" that is substantially perpendicular to the surface 212 away from the surface 212. The decease may be linear, exponential, polynomial or step-wise as described above. The number of the additive materials and the changes in the amounts of the additive materials may be the same as described above.

FIG. 9C illustrates the antenna 202 having the surface 143 at the MFS 139, and the apex 220 is located on the surface 143. In one embodiment, the antenna 202 is made of a compound having the highest amount of additive material in the primal material at the apex 220, and the amount of the additive material deceases in a direction "D4" away from the apex 220. The direction "D4" may be a direction that is about 45 degrees with respect to the MFS 139, or a direction that is between the along-the-track direction X and the direction Z that is substantially perpendicular to the MFS 139. The distribution of the additive material in the direction "D4" from the apex 220 may also follow the temperature distribution described in FIG. 3 such that zone 4 has the highest amount of additive material, zone 3 has a smaller amount of the additive material than zone 4, zone 2 has a smaller amount of the additive material than zone 3, zone 1 has a smaller amount of the additive material than zone 2, and zone 0 has no additive material. The decease may be linear, exponential, polynomial or step-wise as described above. The number of the additive materials and the changes in the amounts of the additive materials may be the same as described above.

Figure 10A:
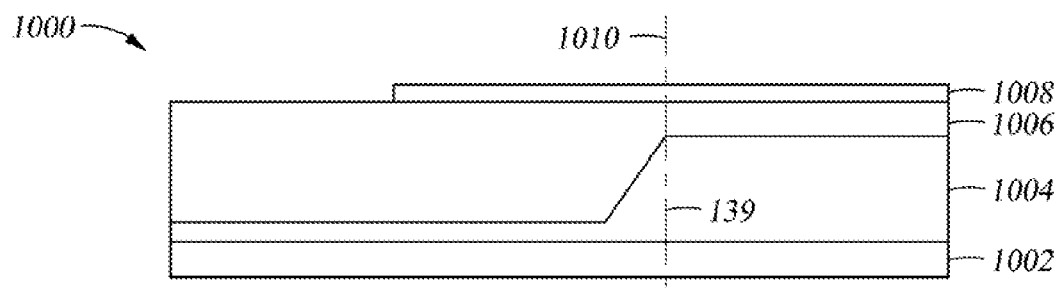
FIGS. 10A-10C illustrate how the additive material is incorporated into the primal material, according to various embodiments.
Figure 10B:
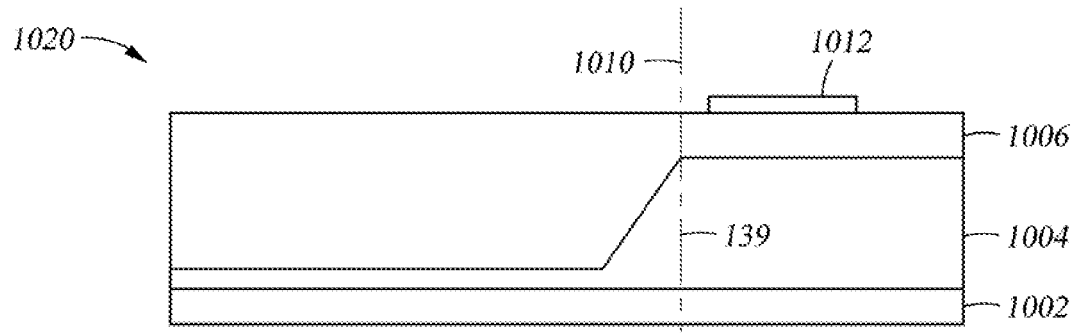
Figure 10C:
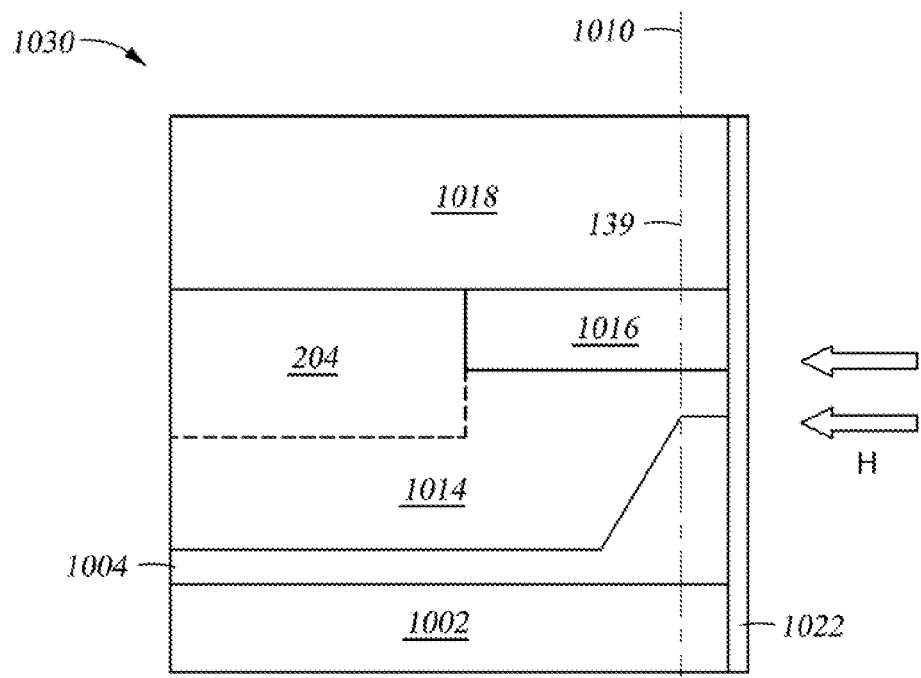

The antenna 202 having a composition that varies based on the location may be made by physical vapor deposition process, such as co-sputtering from multiple targets. Particularly, the compositionally graded additive materials may be co-sputtered and the desired gradient of the additive materials may be achieved by controlling the DC or RF power applied to the targets. Alternatively, the antenna 202 may be formed by various diffusion processes. FIGS. 10A-10C illustrate how the additive material is incorporated into the primal material using diffusion processes, according to various embodiments.

FIG. 10A is a cross sectional side view of a structure 1000 according to one embodiment. The structure 1000 may be formed on a substrate and may be the HAMR head 103 after multiple process steps performed thereon. The structure 1000 may include a first layer 1002, a second layer 1004 deposited on the first layer 1002, a third layer 1006 deposited on the second layer 1004, and a fourth layer 1008 deposited on at least a portion of the third layer 1006. The first layer 1002 may form the waveguide 135, the second layer 1004 may form the cladding material 402, the third layer 1006 may form the antenna 202, and the fourth layer 1008 may be the additive material as described above. The third layer 1006 may be made of the primal material as described above. In one embodiment, the third layer 1006 is made of Au and the fourth layer 1008 is made of Rh. When the structure 1000 is heated to more than 250 degrees Celsius, the additive material of the layer 1008 diffuses into the third layer 1006. The heating of the structure 1000 may be achieved by any suitable method, such as laser heating. The laser beam may be directed to a top surface of the fourth layer 1008 and exposed portion of the third layer 1006. After the diffusion process, the fourth layer 1008 may be removed by any suitable removal process, such as wet etching, reactive ion etching or ion milling. After various processes performed on the structure 1000 to form the HAMR read/write head 101, the structure 1000 is lapped along the line 1010, and the exposed surface is the MFS 139. The resulting structure by the process described above may be the HAMR write head 103 shown in FIG. 4.

FIG. 10B is a cross sectional side view of a structure 1020 according to one embodiment. The structure 1020 may be formed on a substrate and may be the HAMR write head 103 after multiple process steps performed thereon. The structure 1020 may include the first layer 1002, the second layer 1004, the third layer 1006 a fourth layer 1012 deposited on a portion of the third layer 1006 that is later removed. The fourth layer 1012 may be the additive material as described above. When the structure 1020 is heated to more than 250 degrees Celsius, the additive material of the layer 1012 diffuses into the third layer 1006. The heating of the structure 1020 may be achieved by any suitable method, such as laser heating. The laser beam may be directed to a top surface of the fourth layer 1012. After various processes performed on the structure 1020 to form the HAMR read/write head 101, the structure 1020 is lapped along the line 1010, removing a portion of the first layer 1002, second layer 1004, third layer 1006 and the entire fourth layer 1012. The exposed surface of the remaining portion is the MFS 139. The resulting structure by the process described above may be the HAMR write head 103 shown in FIG. 9C.

FIG. 10C is a cross sectional side view of a structure 1030 according to one embodiment. The structure 1030 may be formed on a substrate and may be the HAMR head 103 after multiple process steps performed thereon. The structure 1030 may include the first layer 1002, the second layer 1004, a third layer 1014 deposited on the second layer 1004, the thermal shunt 204 deposited on a first portion of the third layer 1014, a fourth layer 1016 deposited on a second portion of the third layer 1014, and a fifth layer 1018 deposited on the thermal shunt 204 and the fourth layer 1016. The third layer 1014 may form the antenna 202, the fourth layer 1016 may form the spacer layer 404, and the fifth layer 1018 may form the main pole 142. The third layer 1014 may be made of the primal material as described above. A sixth layer 1022 may be formed on a vertical surface of each of the layers 1002, 1004, 1014, 1016 and 1018. The sixth layer 1022 may be made of the additive material as described above. When the structure 1030 is heated to more than 250 degrees Celsius, the additive material of the layer 1022 diffuses into the third layer 1014. The heating of the structure 1030 may be achieved by any suitable method, such as laser heating. The laser beam may be directed to the sixth layer 1022 at a location near the third layer 1014 as indicated by arrows "H" shown in FIG. 10C. After the diffusion process and various processes performed on the structure 1030 to form the HAMR read/write head 101, the structure 1030 is lapped along the line 1010, and the exposed surface is the MFS 139. The resulting structure by the process described above may be the HAMR write head 103 shown in FIG. 9A.

In summary, a HAMR head having a NFT including an antenna that is made of a compound having a composition that varies based on the location is disclosed. The compound may include a primal material and one or more additive materials. At the location where the highest temperature is endured, the amount of the additive material in the primal material may be the highest to improve thermal stability. The amount of the additive material gradually decreases as moving away from the area having the highest temperature to improve thermal conductivity. The reliability of the HAMR head is improved as a result of the improved thermal stability.

While the foregoing is directed to embodiments of the disclosure, other and further embodiments may be devised without departing from the basic scope thereof, and the scope thereof is determined by the claims that follow.

What is claimed is:

1. A heat assisted magnetic recording head, comprising:
a main pole;
a waveguide; and
a near-field transducer disposed between the main pole and the waveguide, wherein the near-field transducer comprises an antenna, wherein the antenna includes a first surface at a media facing surface, wherein the first surface has an apex, and wherein the antenna comprises a compound having a composition that varies from the apex in a direction away from the apex.

2. The heat assisted magnetic recording head of claim 1, wherein the composition of the compound of the antenna includes a primal material and one or more additive materials, wherein the composition of the compound of the antenna further includes a highest amount of the one or more additive materials at the apex, and the amount of the one or more additive materials decreases from the apex in the direction that is away from the apex.

3. The heat assisted magnetic recording head of claim 2, wherein the primal material is selected from the group consisting of Au, Ag, Cu, or Al, and a composite material having two to four elements selected from Au, Ag, Cu and Al.

4. The heat assisted magnetic recording head of claim 2, wherein the one or more additive materials are selected from the group consisting of Rh, Co, Ni, Pt, Pd, Ru, B, Mo, W, Ti, Ir and Re.

5. The heat assisted magnetic recording head of claim 2, wherein the decrease in the amount of the one or more additive materials in the primal materials is linear.

6. The heat assisted magnetic recording head of claim 2, wherein the decrease in the amount of the one or more additive materials in the primal materials is exponential.

7. The heat assisted magnetic recording head of claim 2, wherein the decrease in the amount of the one or more additive materials in the primal materials is polynomial.

8. The heat assisted magnetic recording head of claim 2, wherein the decrease in the amount of the one or more additive materials in the primal materials is step-wise.

9. The heat assisted magnetic recording head of claim 2, wherein the amount of the one or more additive materials decreases from the apex in a direction that is about 45 degrees with respect to the media facing surface.

10. The heat assisted magnetic recording head of claim 2, wherein the amount of the one or more additive materials decreases from the apex in a direction that is substantially perpendicular to the media facing surface.

11. The heat assisted magnetic recording head of claim 2, wherein the amount of the one or more additive materials decreases from the apex in a direction that is substantially parallel to the media facing surface.

12. A heat assisted magnetic recording head, comprising:
a main pole;
a waveguide; and
a near-field transducer disposed between the main pole and the waveguide, wherein the near-field transducer comprises an antenna, wherein the antenna includes a first surface at a media facing surface, a second surface facing the waveguide, and a third surface connecting the first and second surfaces, and wherein the antenna comprises a compound having a composition that varies from the third surface in a direction that is substantially perpendicular to the third surface.

13. The heat assisted magnetic recording head of claim 12, wherein the composition of the compound of the antenna includes a primal material and one or more additive materials, wherein the composition of the compound of the antenna further includes a highest amount of the one or more additive materials at the third surface, and the amount of the one or more additive materials decreases from the third surface in the direction that is substantially perpendicular to the third surface.

14. The heat assisted magnetic recording head of claim 13, wherein the primal material is selected from the group consisting of Au, Ag, Cu, or Al, and a composite material having two to four elements selected from Au, Ag, Cu and Al.

15. The heat assisted magnetic recording head of claim 13, wherein the one or more additive materials are selected from the group consisting of Rh, Co, Ni, Pt, Pd, Ru, B, Mo, W, Ti, Ir and Re.

16. The heat assisted magnetic recording head of claim 13, wherein the decrease in the amount of the one or more additive materials in the primal materials is linear, exponential, polynomial or step-wise.

17. A hard disk drive, comprising:
a magnetic media;
a magnetic read head; and
a heat assisted magnetic recording magnetic write head, wherein the heat assisted magnetic recording magnetic write head comprises:
a main pole;
a waveguide; and
a near-field transducer disposed between the main pole and the waveguide, wherein the near-field transducer comprises an antenna, wherein the antenna includes a first surface at a media facing surface, wherein the first surface has an apex, and wherein the antenna comprises a compound having a composition that varies from the apex in a direction away from the apex.

18. The hard disk drive of claim 17, wherein the composition of the compound of the antenna includes a primal material and one or more additive materials, wherein the composition of the compound of the antenna further includes a highest amount of the one or more additive materials at the apex, and the amount of the one or more additive materials decreases from the apex in the direction that is away from the apex.

19. The hard disk drive of claim 18, wherein the primal material is selected from the group consisting of Au, Ag, Cu, or Al, and a composite material having two to four elements selected from Au, Ag, Cu and Al, and the one or more additive materials are selected from the group consisting of Rh, Co, Ni, Pt, Pd, Ru, B, Mo, W, Ti, Ir and Re.

20. The hard disk drive of claim 18, wherein the decrease in the amount of the one or more additive materials in the primal materials is linear, exponential, polynomial or step-wise.

* * * * *